US012066775B2

(12) United States Patent
Matsubara et al.

(10) Patent No.: US 12,066,775 B2
(45) Date of Patent: Aug. 20, 2024

(54) FIXING DEVICE AND IMAGE FORMING APPARATUS

(71) Applicant: FUJIFILM Business Innovation Corp., Tokyo (JP)

(72) Inventors: Takashi Matsubara, Kanagawa (JP); Takashi Ohashi, Kanagawa (JP); Takuma Ishihara, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 17/888,416

(22) Filed: Aug. 15, 2022

(65) Prior Publication Data

US 2023/0305455 A1 Sep. 28, 2023

(30) Foreign Application Priority Data

Mar. 23, 2022 (JP) ................................ 2022-047447

(51) Int. Cl.
*G03G 15/20* (2006.01)

(52) U.S. Cl.
CPC ................................ *G03G 15/2025* (2013.01)

(58) Field of Classification Search
CPC ....... G03G 15/2025; G03G 2215/2019; G03G 2215/2029
See application file for complete search history.

(56) References Cited

U.S. PATENT DOCUMENTS

| | | | | |
|---|---|---|---|---|
| 2003/0021616 A1* | 1/2003 | Yoda | G03G 15/2064 399/329 |
| 2006/0182474 A1* | 8/2006 | Naito | G03G 15/2053 399/329 |
| 2012/0163882 A1* | 6/2012 | Kim | G03G 15/2025 399/328 |
| 2013/0209146 A1* | 8/2013 | Yamaji | G03G 15/2053 399/329 |
| 2016/0132003 A1* | 5/2016 | Koda | G03G 15/2017 399/329 |
| 2017/0176899 A1* | 6/2017 | Okamoto | G03G 15/2025 |
| 2019/0278204 A1* | 9/2019 | Nanjo | G03G 15/2064 |
| 2019/0346797 A1* | 11/2019 | Okajima | G03G 15/2053 |
| 2020/0089147 A1* | 3/2020 | Hasegawa | G03G 15/2025 |

FOREIGN PATENT DOCUMENTS

| | | |
|---|---|---|
| JP | H09120223 | 5/1997 |
| JP | 2004191744 A * | 7/2004 |

* cited by examiner

*Primary Examiner* — Carla J Therrien
(74) *Attorney, Agent, or Firm* — JCIPRNET

(57) ABSTRACT

A fixing device includes an endless belt-shaped section; a supply section that supplies a lubricating material to an inner surface of the belt-shaped section; a heating section that supports and rotates the belt-shaped section and generates heat during energization to heat the belt-shaped section; a power feed section that is electrically connected to an end part of the heating section and feeds power to the heating section; and a regulating section that is disposed on an outer surface side of the heating section and inside the power feed section with respect to an axial direction of rotation of the heating section to regulate movement of the lubricating material to a power feed section side.

16 Claims, 4 Drawing Sheets

FIXING DEVICE AND IMAGE FORMING APPARATUS

CROSS-REFERENCE TO RELATED APPLICATIONS

This application is based on and claims priority under 35 USC 119 from Japanese Patent Application No. 2022-047447 filed Mar. 23, 2022.

BACKGROUND

(i) Technical Field

The present invention relates to a fixing device and an image forming apparatus.

(ii) Related Art

In image forming apparatuses, a technique described in JP1997-120223A (Paragraphs 0018 to 0023 and FIG. 1) is known with respect to a fixing device that fixes an unfixed developer transferred to the medium.

JP1997-120223A (Paragraphs 0018 to 0023 and FIG. 1) describes a configuration in which, in a heating roller (1) in which a core roller (10), an electrically insulating layer (15), a resistance heat generation layer (13), and a release layer (14) are laminated, both end parts of the resistance heat generation layer (13) in a roller axial direction are longer than the release layer (14) and are exposed, and ring-shaped power receiving members (11*a*, 11*b*) are mounted on the exposed portions, and power is fed from power feed members (12*a*, 12*b*) to the power receiving members (11*a*, 11*b*).

SUMMARY

Aspects of non-limiting embodiments of the present disclosure relate to a fixing device and an image forming apparatus that prevent a lubricating material from entering a power feed section in the fixing device in which the power feed section for feeding power to a heating section is provided and the lubricating material is supplied to an inner surface of a belt-shaped section.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided a fixing device including an endless belt-shaped section; a supply section that supplies a lubricating material to an inner surface of the belt-shaped section; a heating section that supports and rotates the belt-shaped section and generates heat during energization to heat the belt-shaped section; a power feed section that is electrically connected to an end part of the heating section and feeds power to the heating section; and a regulating section that is disposed on an outer surface side of the heating section and inside the power feed section with respect to an axial direction of rotation of the heating section to regulate movement of the lubricating material to a power feed section side.

BRIEF DESCRIPTION OF THE DRAWINGS

Exemplary embodiment(s) of the present invention will be described in detail based on the following figures, wherein.

DETAILED DESCRIPTION

Figure 1:
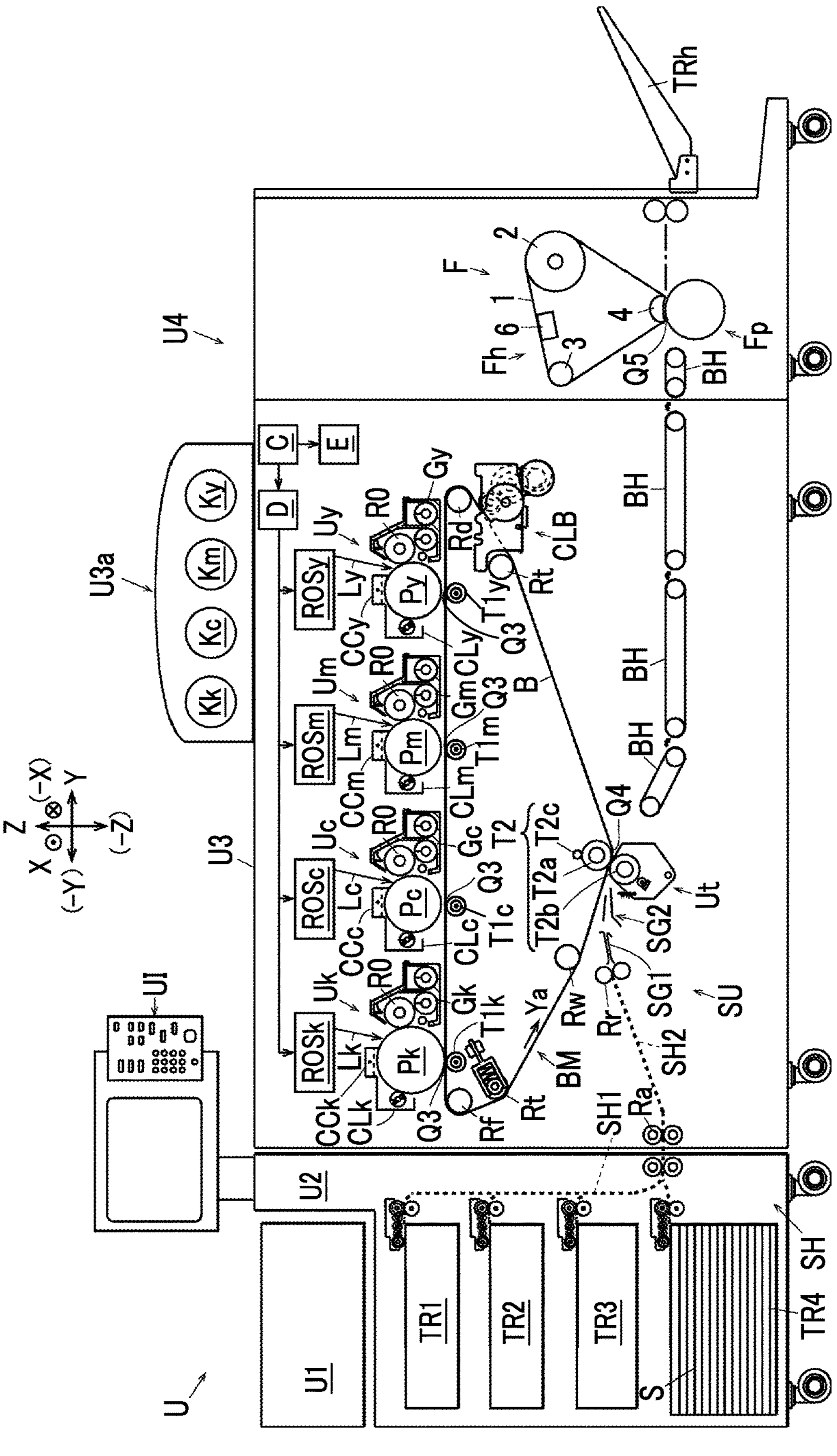
FIG. 1 is an overall explanatory view of an image forming apparatus according to Example 1 of the present invention.

Next, examples as specific examples of an exemplary embodiment of the present invention will be described with reference to drawings, but the present invention is not limited to the following Examples.

In addition, in order to facilitate the understanding of the following explanations, in the drawings, a front-back direction is referred to as an X-axis direction, a left-right direction is referred to as a Y-axis direction, and an up-down direction is referred to as a Z-axis direction, directions or sides indicated by arrows X, –X, Y, –Y, Z, and –Z are respectively a front, back, right, left, up, and down, or front side, back side, right side, left side, upper side, and lower side.

Additionally, in the drawings, one in which "·" is described in "O" means an arrow directed from the back to the front of the paper, and one in which "X" is described in "O" means an arrow directed from the front to the back of the paper.

In addition, in the explanation using the following drawings, illustrations other than members necessary for the explanation are omitted appropriately for the sake of easy understanding.

EXAMPLE 1

FIG. 1 is an overall explanatory view of an image forming apparatus according to Example 1 of the present invention.

In FIG. 1, a copying machine U as an example of the image forming apparatus includes an operating part UI, a scanner device U1 as an example of an image reading device, a paper feed device U2, a printer part U3 as an example of an image recording device, and a paper ejection part U4.

The operating part UI has a power button, a copy start key, a copy number setting key, numeric keypads, and the like, as examples of an input part, a display part, and the like.

The scanner device U1 reads an original document (not shown), converts the read data into image information, and inputs the converted information to the printer part U3.

The paper feed device U2 has a plurality of paper feed trays TR1 to TR4 as an example of the paper feed part. Recording paper S as an example of the medium is accommodated in each of the paper feed trays TR1 to TR4. A paper feed route SH1 as an example of a medium transport route extends from the paper feed trays TR1 to TR4 toward the printer part U3.

In FIG. 1, the printer part U3 has a control part C, a power source circuit E controlled by the control part C to supply power to each member of the printer part U3, and the like. The control part C receives the image information of the original document read by the scanner device U1 and image information transmitted from a personal computer as an example of an information transmission device (not shown) connected to the copying machine U.

The control part C processes the received image information into Y: yellow, M: magenta, C: cyan, and K: black printing information, and outputs the processed information to a laser drive circuit D as an example of a drive circuit of a latent image writing device. The laser drive circuit D outputs a laser drive signal input from the control part C to exposure devices ROSy, ROSm, ROSc, and ROSk as examples of a latent image forming section for each color at a preset timing.

Image holder units Uy, Um, Uc, and Uk of Y, M, C, and K are disposed below the respective exposure device ROSy to ROSk.

In FIG. 1, the K: black image holder unit Uk has a photoconductor drum Pk as an example of an image holding section, a charging corotron CCk as an example of a charging section, and a photoconductor cleaner CLk as an example of a cleaning section for the image holding section. Also, the image holder units Uy, Um, and Uc of the other colors Y, M, and C also have photoconductor drums Py, Pm, and Pc, charging corotrons CCy, CCm, and CCc, and photoconductor cleaners CLy, CLm, and CLc.

In addition, in Example 1, the K-color photoconductor drum Pk, which has a high frequency of use and has a large surface wear, is configured to have a larger diameter than the photoconductor drums Py, Pm, and Pc of other colors, and is compatible with high-speed rotation and has a long service life.

The photoconductor drums Py, Pm, Pc, and Pk are uniformly charged by the charging corotrons CCy, CCm, CCc, and CCk, respectively, and then electrostatic latent images are formed on the surfaces of the photoconductor drums Py to Pk by laser beams Ly, Lm, Lc, and Lk as examples of latent image writing light output by the exposure devices ROSy to ROSk. The electrostatic latent images on the surfaces of the photoconductor drums Py to Pk are developed into toner images of respective colors of Y: yellow, M: magenta, C: cyan, and K: black by developing rolls R0 examples of developing members provided in the developing devices Gy, Gm, Gc, Gk as examples of a developing section.

The toner images on the surfaces of the photoconductor drums Py to Pk are sequentially and overlappingly transferred to an intermediate transfer belt B as examples of an intermediate transfer section and examples of the image holding section, in a primary transfer region Q3 by primary transfer rolls T1*y*, T1*m*, T1*c*, and T1*k* as examples of a primary transfer section, and a multicolor image, a so-called color image, is formed on the intermediate transfer belt B. The color image formed on the intermediate transfer belt B is transported to a secondary transfer region Q4.

In addition, in the case of only black image data, only the K: black photoconductor drum Pk and the developing device Gk are used, and only a black toner image is formed.

After the primary transfer, residual toners remaining on the surfaces of the photoconductor drums Py to Pk are cleaned by the photoconductor cleaners CLy, CLm, CLc, and CLk.

Toner image forming members Uy+Gy, Um+Gm, Uc+Gc, and Uk+Gk as examples of a visible image forming unit is constituted by the respective image holder units Uy to Uk and the developing devices Gy to Gk.

A toner dispenser U3*a* as an example of a replenishment section is disposed on an upper portion of the printer part U3, and toner cartridges Ky, Km, Kc, and Kk as examples of a developer accommodation section are attachably and detachably mounted on the toner dispenser U3*a*. In a case where the toner is consumed in the developing devices Gy to Gk with the image formation, the toner is supplied from each of the toner cartridges Ky to Kk to each of the developing devices Gy to Gk.

The intermediate transfer belt B disposed below the photoconductor drums Py to Pk is stretched by an intermediate drive roll Rd as an example of a drive section of an intermediate transfer section, an intermediate tension roll Rt an example of a tension application unit that applies tension to the intermediate transfer belt B, an intermediate steering roll Rw as an example of a first bias correction section that corrects bias or meandering of the intermediate transfer belt B, and a plurality of intermediate idler rolls Rf as examples of a driven section, and a backup roll T2*a* as an example of a facing section of the secondary transfer region. Also, the intermediate transfer belt B is supported so as to be rotatable and movable in a direction of arrow Ya by being driven by the intermediate drive roll Rd.

A belt module BM as an example of the intermediate transfer device is constituted by the intermediate drive roll Rd, the intermediate tension roll Rt, the intermediate steering roll Rw, the intermediate idler roll Rf, the backup roll T2*a*, the primary transfer rolls T1*y* to T1*k*, the intermediate transfer belt B, and like. In addition, the belt module BM of Example 1 is configured by a unit that is attachable and detachable or replaceable with respect to the printer part U3.

A secondary transfer unit Ut as an example of a transfer and transport section is disposed below the backup roll T2*a*. The secondary transfer unit Ut has a secondary transfer roll T2*b* as an example of a transfer member. The secondary transfer roll T2*b* is disposed so as to face the backup roll T2*a*. The secondary transfer region Q4 is constituted by a region where the secondary transfer roll T2*b* faces the intermediate transfer belt B. Additionally, the backup roll T2*a* is in contact with a contact roll T2*c* as an example of a contact section that applies a voltage. A secondary transfer voltage having the same polarity as the charging polarity of the toner is applied to the contact roll T2*c* at a preset timing from the power source circuit E controlled by the control part C.

A secondary transfer device T2 as an example of a secondary transfer section is constituted by each of the rolls T2*a* to T2*c*. Additionally, a transfer device B+T1+T2 as an example of a transfer section is constituted by the intermediate transfer belt B, the primary transfer rolls T1*y* to T1*k*, the secondary transfer device T2, and the like.

A paper transport route SH2 is disposed below the belt module BM. The recording paper S fed from the paper feed route SH1 of the paper feed device U2 is transported to the paper transport route SH2 by the transport roll Ra as an example of a transport section. The recording paper S of the paper transport route SH2 is fed by a registration roll Rr as an example of a delivery section at the timing when the toner image is transported to the secondary transfer region Q4, and is guided by paper guides SG1 and SG2 as examples of a medium guide unit and transported to the secondary transfer region Q4.

The toner image on the intermediate transfer belt B is transferred to the recording paper S by the secondary transfer device T2 in a case where the toner image passes through the secondary transfer region Q4. In addition, in the case of a color image, the toner images that are overlapped on the surface of the intermediate transfer belt B and are primarily transferred are collectively and secondarily transferred to the recording paper S.

The intermediate transfer belt B after the secondary transfer is cleaned by a belt cleaner CLB as an example of the cleaning section of the intermediate transfer section.

The recording paper S to which the toner image is secondarily transferred is sent to the medium transport belt BH as an example of the transport section. The medium transport belt BH transports the recording paper S to a fixing device F. The fixing device F as an example of a fixing section has a heating unit Fh as an example of a heating part and a pressure roll Fp as an example of a pressure section, and a fixing region Q5 is formed by a region where the heating unit Fh and the pressure roll Fp face and come into contact with each other.

In a case where the toner image on the recording paper S passes through the fixing region Q5, the toner image is heated and fixed by the fixing device F. The recording paper S on which the toner image is fixed by the fixing device F is ejected to an ejection tray TRh as an example of an ejection part.

The paper transport route SH is constituted by the reference numerals SH1, SH2, and the like. Additionally, the paper transport device SU is constituted by the reference numerals SH, Ra, Rr, SG1, SG2, BH, and the like.

Explanation of Fixing Device

In FIG. 1, the heating unit Fh of the fixing device F of Example 1 has an endless fixing belt 1 as an example of a belt-shaped section. The fixing belt 1 of Example 1 is an example of a heating section, and is supported by a heat generation roll 2 as an example of a heat generation member, a drive roll 3 as an example of a drive section, and a fixing pad 4 as an example of a facing section. The heat generation roll 2 generates heat during the image forming operation to heat the fixing belt 1. The drive roll 3 rotates the fixing belt 1 during the image formation. The fixing pad 4 makes the fixing belt 1 face the pressure roll Fp in the fixing region Q5. Additionally, a lubrication wick 6 is disposed as an example of a lubrication section and as an example of a supply section on an inner surface side of the fixing belt 1. The lubrication wick 6 supplies silicon oil as an example of a lubricating material for lubricating the fixing belt 1 and the fixing pad 4 to the inner surface of the fixing belt 1.

Explanation of Heat Generation Roll

Figure 2:
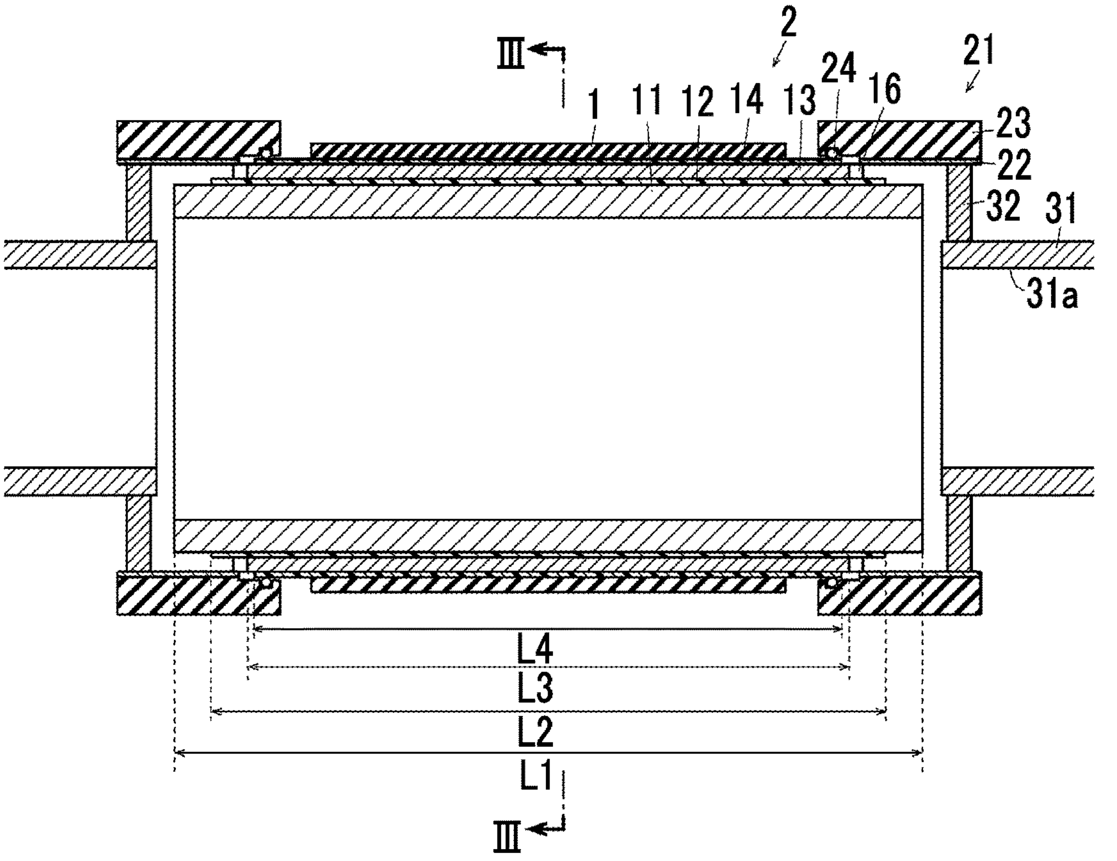
FIG. 2 is a schematic explanatory view of a heat generation roll of Example 1.

FIG. 2 is a schematic explanatory view of the heat generation roll of Example 1.

Figure 3:
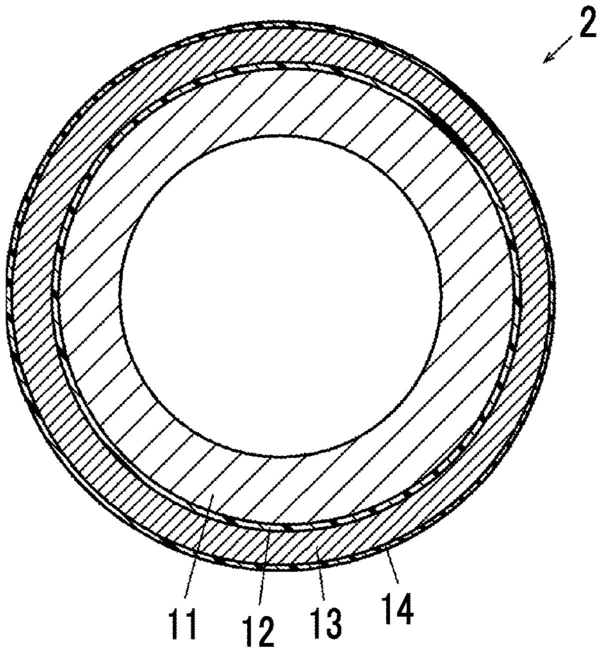
FIG. 3 is a cross-sectional view of major parts of the heat generation roll of Example 1.

FIG. 3 is a cross-sectional view of major parts of the heat generation roll of Example 1.

In FIGS. 2 and 3, the heat generation roll 2 of Example 1 has a core metal 11 as an example of a base layer. The core metal 11 of Example 1 is made of a conductive metal material. It is preferable that the core metal 11 is made of, for example, aluminum, but it is also possible to use a conductive alloy such as iron or stainless steel. Additionally, the core metal 11 of Example 1 is formed in a cylindrical shape that extends in a rotation axis direction.

An insulating layer 12 as an example of an insulating portion is formed on an outer periphery of the core metal 11. The insulating layer 12 of Example 1 is made of an electrically insulating material, and as an example, a polyimide resin, a glass resin, a PEEK resin, a fluororesin, a polyamide resin, a polyimideamide resin, and a PEKK (polyetherketoneketone) resin, or the like can be used.

A heat generation layer 13 as an example of a heat generation portion is formed on an outer surface side of the insulating layer 12. The heat generation layer 13 is configured by a resistance heating element that generates heat during energization. In addition, since the resistance heating element itself is described in, for example, JP1997-120223A (Paragraphs 0018 to 0023 and FIG. 1) and is known in the related art, detailed description thereof will be omitted.

A surface layer 14 as an example of an outer layer and an example of the insulating layer is formed on an outer surface side of the heat generation layer 13. It is desirable that the surface layer 14 of Example 1 is made of, for example, an electrically insulating material. In a case where the surface layer 14 is made of a conductive material, there are problems that current easily flows from the heat generation layer 13, there is a need to increase the power capacity of the power source circuit E and a leak to the fixing belt 1 occurs. Thus, it is desirable that the surface layer 14 is made of, for example, the electrically insulating material. As the electrically insulating material, for example, a polyimide resin, a glass resin, a PEEK resin, a fluororesin, a polyamide resin, a polyimideamide resin, a PEKK (polyetherketoneketone) resin, or the like can be used. Additionally, it is desirable that the surface layer 14 of Example 1 is made of, for example, a wear-resistant material in response to contact or wear with the fixing belt 1. Examples of a material having electrical insulation and wear resistance include polyimide resin, glass resin, PEEK resin, and fluororesin.

Moreover, it is desirable that the surface layer 14 of Example 1, for example, has a lower (heat resistance)=(thermal conductivity)×(thickness) than the insulating layer 12 from the viewpoint of the transfer efficiency of heat to the fixing belt 1. That is, out of the insulating layer 12 and the surface layer 14 sandwiching the heat generation layer 13, the smaller the heat resistance, the easier the heat is transferred. Therefore, for example, it is desirable that the heat resistance of the surface layer 14 on the fixing belt 1 side is smaller. Thus, in a case where the surface layer 14 is made of the same PEEK resin as the insulating layer 12, for example, it is preferable that the heat resistance can be lowered by making the thickness of the surface layer 14 smaller than the thickness of the insulating layer 12.

In FIG. 2, in the heat generation roll 2 of Example 1, the length thereof in the rotation axis direction is the longest in a length L1 of the core metal 11, a length L2 of the insulating layer 12, a length L3 of the heat generation layer 13, and the length L4 of the surface layer 14 are set to L1>L2>L3≥L4.

Silver paste 16 for feeding power is applied to both end parts of the heat generation layer 13 in the axial direction, as an example of an electrode.

Terminal portions 21 to which power is fed are disposed as an example of electrodes at both the end parts of the heat generation roll 2 in the axial direction.

Each terminal portion 21 has a contact ring 22 as an example of a contact portion. The contact ring 22 is configured in a ring shape. An inner end part of the contact ring 22 is in contact with the silver paste 16.

The contact ring 22 is supported by a cover 23 as an example of a covering portion. The cover 23 of Example 1 is made of an electrically insulating material.

An O-ring 24 as an example of a regulating section is supported at an axially inner end part of the cover 23. The O-ring 24 is supported by an outer surface of an axial end part of the surface layer 14, that is, an outer surface of the heat generation roll 2. The O-ring 24 of Example 1 is made of an annular (ring-shaped) elastic body, and is supported in a state of being in close contact with the surface layer 14 by elastic force.

The terminal portion 21 of Example 1 is constituted by respective parts designated by reference numerals 22 to 24.

A power feed shaft 31 as an example of a power feed section is disposed inside the contact ring in the radial direction of the heat generation roll 2. The power feed shaft 31 of Example 1 is formed in a tubular shape, and a through-hole 31*a* through which a member can pass in the axial direction is formed inside the power feed shaft 31.

A power feed ring 32 is disposed on an outer periphery of the power feed shaft 31. The power feed ring 32 is in contact with the contact ring 22. The power feed shaft 31 is connected to a power source circuit (not shown). Therefore, power for heat generation is supplied to the heat generation layer 13 via the power feed shaft 31, the power feed ring 32, and the contact ring 22.

Action of Example 1

In the copying machine U of Example 1 including the above configuration, in a case where the image forming operation is started, the heat generation layer 13 is energized, the heat generation layer 13 generates heat, and the heat generation roll 2 heats the fixing belt 1 to raise the temperature of the fixing region Q5 to a predetermined fixing temperature. Then, the recording paper S passing through the fixing region Q5 is heated to fix the toner.

In a configuration in which the fixing belt is stretched on the heat generation roll as shown in JP1997-120223A (Paragraphs 0018 to 0023 and FIG. 1), a lubricating material is applied to the inner surface of the fixing belt in order to suppress wear of the fixing belt. The lubricating material supplied to the fixing belt adheres to the surface of the heat generation roll that comes into contact with the fixing belt. Then, the adhered lubricating material travels along the surface of the heat generation roll and reaches the power feed portion at a radial end part of the heat generation roll. In a case where the lubricating material enters the power feed portion, the electrical resistance value may change, poor contacting, or the like may occur, and poor power feed may occur.

In contrast, in Example 1, the O-ring 24 is supported by an axial end part of the surface layer 14 that come into contact with the fixing belt 1. Therefore, the movement of the lubricating material the fixing belt 1 is prevented (regulated) from moving to the outside of the O-ring 24 is hindered (regulated). Therefore, the entering of the lubricating material into the contact ring 22, the power feed ring 32, and the power feed shaft 31 disposed outside the O-ring 24 is suppressed. Therefore, the occurrence of poor energization and poor power feed is suppressed, and the fixing operation is stabilized.

In particular, in Example 1, the O-ring 24 is added to the related-art configuration having no regulating section to suppress the entering of the lubricating material. Therefore, it is not necessary to change the shape of the heat generation roll 2, and the change to the existing fixing device F may be reduced. Additionally, the O-ring 24 has a relatively low cost configuration, and may be brought into close contact with the surface layer 14 such that the lubricating material does not enter by utilizing the elasticity of the O-ring 24 itself.

EXAMPLE 2

Next, Example 2 of the present invention will be described. In the description of Example 2, the constituent elements corresponding to the constituent elements of Example 1 are designated by the same reference numerals, and detailed description thereof will be omitted.

Example 2 is different from the above-mentioned Example 1 in the following points, but is configured similar to the above-mentioned Example 1 in other points.

Figure 4:
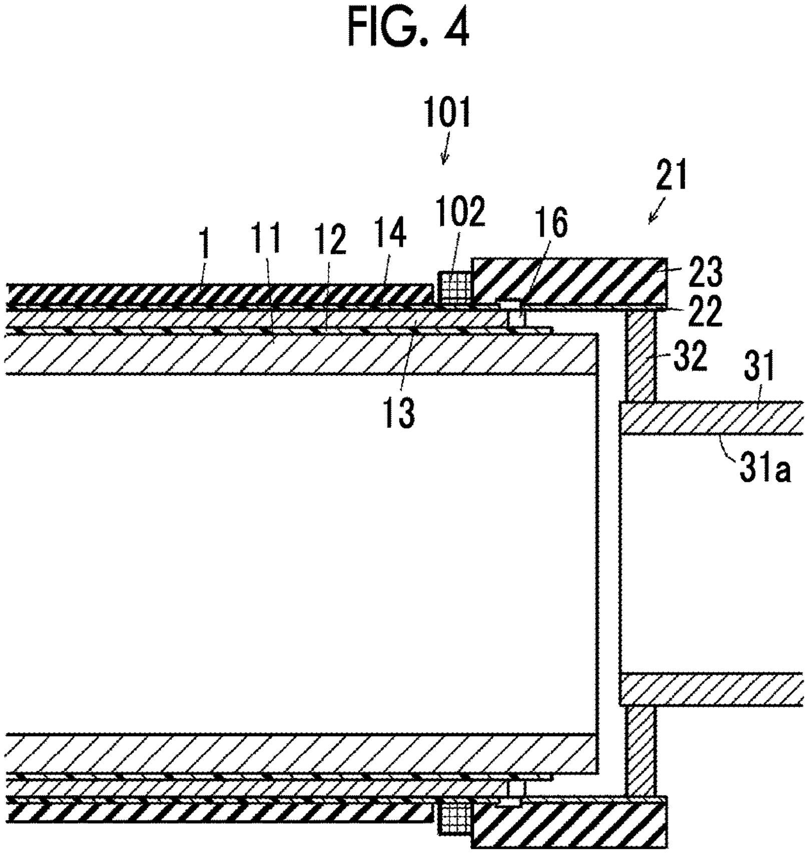
FIG. 4 is an explanatory view of a heat generation roll of Example 2, and is a view corresponding to FIG. 2 of Example 1.

FIG. 4 is an explanatory view of a heat generation roll of Example 2, and is a view corresponding to FIG. 2 of Example 1.

In FIG. 4, in the heat generation roll 101 of Example 2, an oil absorbing felt 102, which is an example of the regulating section and is an example of an absorbent material, is disposed instead of the O-ring 24 of Example 1. The oil absorbing felt 102 is in contact with and supported by the surface of the surface layer 14. The oil absorbing felt 102 is made of a material that can absorb and retain an oil-like lubricating material.

Action of Example 2

In the heat generation roll 101 of Example 2 including the above configuration, the lubricating material adhering to the surface layer 14 is absorbed by the oil absorbing felt 102 disposed at the axial end part. Therefore, the lubricating material is prevented from entering the contact ring 22 or the like disposed axially outside the oil absorbing felt 102. Therefore, similar to Example 1, the occurrence of poor power feed is suppressed.

EXAMPLE 3

Next, Example 3 of the present invention will be described. In the description of Example 3, the constituent elements corresponding to the constituent elements of Example 1 are designated by the same reference numerals, and detailed description thereof will be omitted.

Example 3 is different from the above-mentioned Example 1 in the following points, but is configured similar to the above-mentioned Example 1 in other points.

Figure 5:
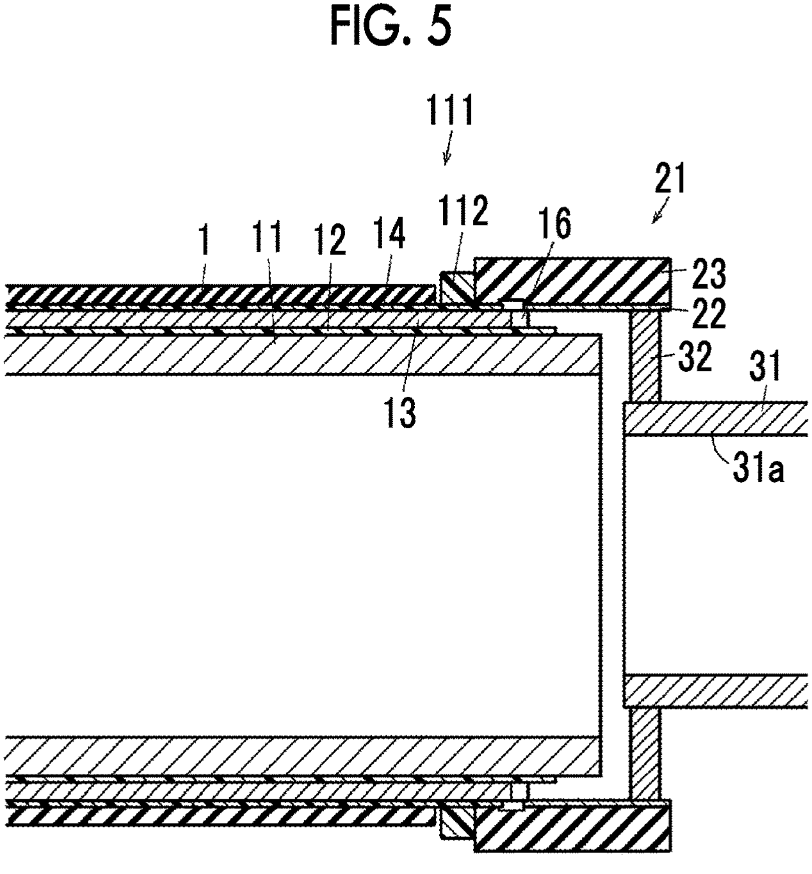
FIG. 5 is an explanatory view of a heat generation roll of Example 3, and is a view corresponding to FIG. 2 of Example 1.

FIG. 5 is an explanatory view of a heat generation roll of Example 3, and is a view corresponding to FIG. 2 of Example 1.

In FIG. 5, in a heat generation roll 111 of Example 3, an oil-repellent material 112 as an example of the regulating section is disposed instead of the O-ring 24 of Example 1. As an example, the oil-repellent material 112 is made of an oil-repellent material that repels oil, and is made of a material that repels the oil-like lubricating material. As the oil-repellent material 112, any known oil-repellent material can be used, and a fluororesin can be used.

Action of Example 3

In the heat generation roll 111 of Example 3 including the above configuration, the lubricating material adhering to the surface layer 14 is repelled by the oil-repellent material 112 disposed at the axial end part. Therefore, the lubricating material is prevented from entering the contact ring 22 or the like disposed axially outside the oil-repellent material 112. Therefore, similar to Example 1, the occurrence of poor power feed is suppressed.

EXAMPLE 4

Next, Example 4 of the present invention will be described. In the description of Example 4, the constituent elements corresponding to the constituent elements of Example 1 are designated by the same reference numerals, and detailed description thereof will be omitted.

Example 4 is different from the above-mentioned Example 1 in the following points, but is configured similar to the above-mentioned Example 1 in other points.

Figure 6:
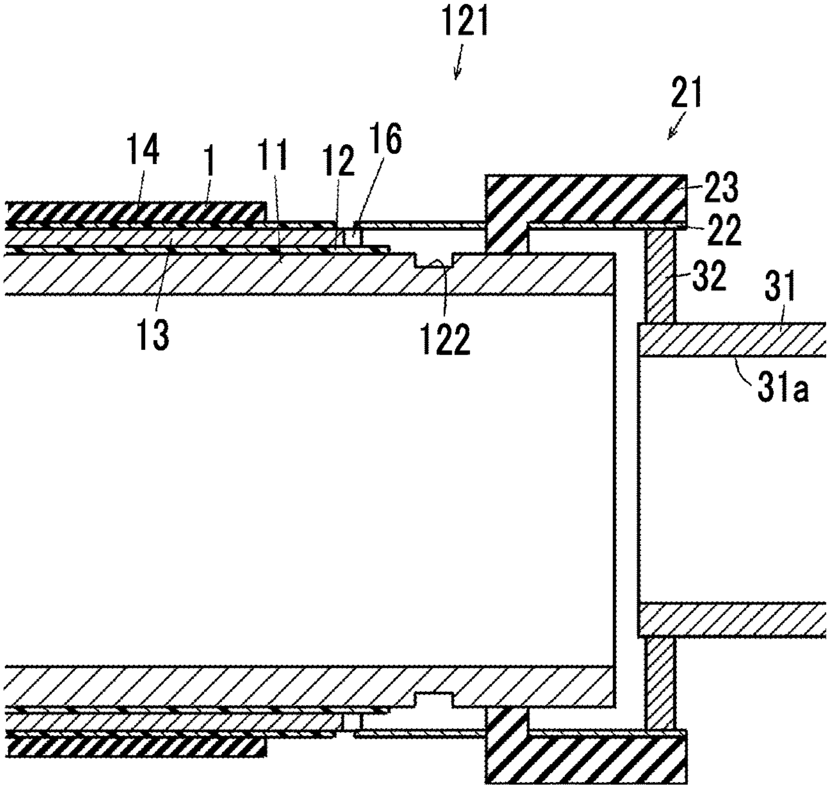
FIG. 6 is an explanatory view of a heat generation roll of Example 4, and is a view corresponding to FIG. 2 of Example 1.

FIG. 6 is an explanatory view of a heat generation roll of Example 4, and is a view corresponding to FIG. 2 of Example 1.

In FIG. 6, a heat generation roll 121 of Example 4 is provided with a recess 122 as an example of the regulating section instead of the O-ring 24 of Example 1. The recess 122 of Example 4 is formed in a ring shape on an outer surface side of an end part of the core metal 11.

Action of Example 4

In the heat generation roll 121 of Example 4 including the above configuration, the lubricating material adhering to the surface layer 14 is stored in the recess 122 disposed at the axial end part. Therefore, as compared to a configuration having no recess 122, the entering of the lubricating material to the axially outer side of the recess 122 is suppressed. In Example 4, the recess 122 is formed axially inside the power feed ring 32 and the power feed shaft 31. Therefore, in Example 4, the lubricating material may adhere to an axially inner end part of the contact ring 22, but the entering of the lubricating material into the contact portion between the contact ring 22 and the power feed ring 32 or the power feed shaft 31 is reduced.

EXAMPLE 5

Next, Example 5 of the present invention will be described. In the description of Example 5, the constituent elements corresponding to the constituent elements of Example 1 are designated by the same reference numerals, and detailed description thereof will be omitted.

Example 5 is different from the above-mentioned Example 1 in the following points, but is configured similar to the above-mentioned Example 1 in other points.

Figure 7:
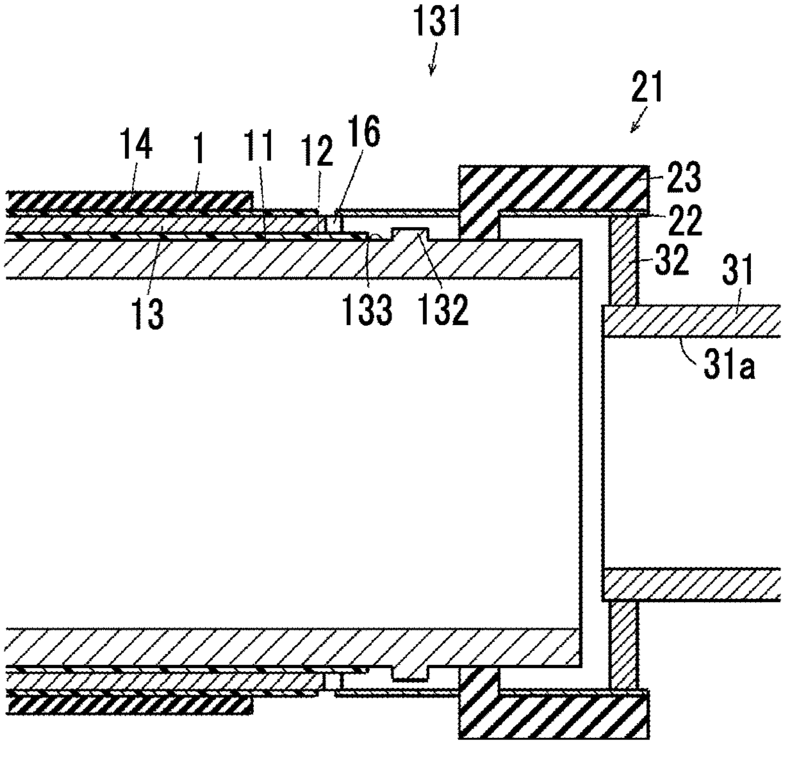
FIG. 7 is an explanatory view of a heat generation roll of Example 5, and is a view corresponding to FIG. 2 of Example 1.

FIG. 7 is an explanatory view of a heat generation roll of Example 5, and is a view corresponding to FIG. 2 of Example 1.

In FIG. 7, a heat generation roll 131 of Example 5 is provided with a protrusion 132 as an example of the regulating section instead of the O-ring 24 of Example 1. The protrusion 132 of Example 5 is formed in a protruding shape locally protruding in the radial direction at an end part of the core metal 11, and is formed in a ring shape along an outer peripheral surface of the core metal 11.

Action of Example 5

In the heat generation roll 131 of Example 5 including the above configuration, the lubricating material adhering to the surface layer 14 is dammed by the protrusion 132 disposed at the axial end part, and is stored in a cavity 133 axially inside the protrusion 132. Therefore, similar to Example 4, the entering of the lubricating material to the axially outer side of the protrusion 132 is suppressed as compared to the configuration having no protrusion 132 in Example 5.

Modification Examples

Although the Examples of the present invention have been described in detail above, the present invention is not limited to the above Examples, and various changes can be made within the scope of the gist of the present invention described in the claims. Examples of Modification Examples (HO1) to (HO8) of the present invention are illustrated below.

(HO1) In the above Examples, the copying machine as an example of the image forming apparatus has been illustrated, but the present invention is not limited to this, and for example, the image forming apparatus can be configured by FAX, a printer, and a multifunction machine.

(HO2) In the above Examples, a configuration in which the four-color developers are used has been exemplified as the image forming apparatus, but the present invention is not limited to this, and for example, can also be applied to a monochromatic image forming apparatus, and image forming apparatus of multiple colors of three colors or less, or five colors or more.

(HO3) In the above Examples, a configuration in which the insulating layer 12 is directly disposed on the surface of the core metal 11 and the heat generation layer 13 is directly disposed on the surface of the insulating layer 12 has been exemplified, but the present invention is not limited to this. For example, as in a case where a primer layer coated with a primer for improving wettability and adhesiveness is provided between the insulating layer 12 and the heat generation layer 13, it is possible to adopt a configuration in which a separate layer is interposed between the insulating layer 12 and the heat generation layer 13.

(HO4) In the above Examples, it is desirable that the surface layer 14 is, for example, provided, but it is also possible to adopt a configuration in which the surface layer 14 is not provided.

(HO5) In the above Examples, it is desirable that the surface layer 14 is made of, for example, an insulating material, but it is also possible to adopt a configuration in which the surface layer 14 is made of a conductive material.

(HO6) In the above Examples, it is desirable that the surface layer 14 is made of, for example, a wear-resistant material, but it is also possible to adopt a configuration in which the surface layer 14 is made of, for example, a material that is easily worn with an emphasis on releasability.

(HO7) In the above Examples, for example, it is desirable that a configuration having a low heat resistance is provided as the surface layer 14, but it is also possible to adopt a configuration having a high heat resistance.

(HO8) In the above Examples, it is desirable that the axial lengths L1 to L4 of each part are configured, for example, as exemplified in the Examples, but can be appropriately changed depending on the design, specifications, and the like.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A fixing device comprising:

an endless fixing belt;

a lubrication wick that supplies a lubricating material to an inner surface of the endless fixing belt;

a heat generation roll that supports and rotates the endless fixing belt and generates heat during energization to heat the endless fixing belt;

a power feed shaft that is electrically connected to an end part of the heat generation roll and feeds power to the heat generation roll;

a first O-ring that is disposed on one outer surface side of the heat generation roll and inside the power feed shaft with respect to an axial direction of rotation of the-heat generation roll to regulate movement of the lubricating material to a power feed shaft side; and a second O-ring that is disposed on another outer surface side of the heat generation roll and inside the power feed shaft with respect to the axial direction of rotation of the heat generation roll to regulate movement of the lubricating material to the power feed shaft side, wherein the another outer surface side of the heat generation roll is opposite to the one outer surface side of the heat generation roll, wherein a distance between the first O-ring and the second O-ring is greater than a width of the endless fixing belt in the axial direction of the heat generation roll.

2. The fixing device according to claim 1, wherein the first O-ring and the second O-ring are supported on an outer surface of the heat generation roll.

3. The fixing device according to claim 2, wherein the first O-ring and the second O-ring are each made of an annular elastic body.

4. An image forming apparatus comprising:

an image holder;

an exposure device that forms a latent image on the image holder;

a developing roll that develops the latent image of the image holder;

a transfer belt that transfers an image of the image holder to a medium; and the fixing device according to claim 3 that fixes the image of the medium.

5. An image forming apparatus comprising:

an image holder;

an exposure device that forms a latent image on the image holder;

a developing roll that develops the latent image of the image holder;

a transfer belt that transfers an image of the image holder to a medium; and the fixing device according to claim 2 that fixes the image of the medium.

6. The fixing device according to claim 1, wherein the first O-ring is formed at the end part of the heat generation roll, and the second O-ring is formed at another end part of the heat generation roll opposite to the end part.

7. An image forming apparatus comprising:

an image holder;

an exposure device that forms a latent image on the image holder;

a developing roll that develops the latent image of the image holder;

a transfer belt that transfers an image of the image holder to a medium; and the fixing device according to claim 6 that fixes the image of the medium.

8. An image forming apparatus comprising:

an image holder;

an exposure device that forms a latent image on the image holder;

a developing roll that develops the latent image of the image holder;

a transfer belt that transfers an image of the image holder to a medium; and the fixing device according to claim 1 that fixes the image of the medium.

9. A fixing device comprising:

an endless fixing belt;

a lubrication wick that supplies a lubricating material to an inner surface of the endless fixing belt;

a heat generation roll that supports and rotates the endless fixing belt and generates heat during energization to heat the endless fixing belt;

a power feed shaft that is electrically connected to an end part of the heat generation roll and feeds power to the heat generation roll;

a first oil absorbing felt that is disposed on one outer surface side of the heat generation roll and inside the power feed shaft with respect to an axial direction of rotation of the-heat generation roll to regulate movement of the lubricating material to a power feed shaft side; and a second oil absorbing felt that is disposed on another outer surface side of the heat generation roll and inside the power feed shaft with respect to the axial direction of rotation of the heat generation roll to regulate movement of the lubricating material to the power feed shaft side, wherein the another outer surface side of the heat generation roll is opposite to the one outer surface side of the heat generation roll, wherein a distance between the first oil absorbing felt and the second oil absorbing felt is greater than a width of the endless fixing belt in the axial direction of the heat generation roll, wherein the first oil absorbing felt and the second oil absorbing felt are made of an absorbent material that absorbs the lubricating material.

10. An image forming apparatus comprising:

an image holder;

an exposure device that forms a latent image on the image holder;

a developing roll that develops the latent image of the image holder;

a transfer belt that transfers an image of the image holder to a medium; and the fixing device according to claim 9 that fixes the image of the medium.

11. A fixing device comprising:

an endless fixing belt;

a lubrication wick that supplies a lubricating material to an inner surface of the endless fixing belt;

a heat generation roll that supports and rotates the endless fixing belt and generates heat during energization to heat the endless fixing belt;

a power feed shaft that is electrically connected to an end part of the heat generation roll and feeds power to the heat generation roll;

a first oil-repellent material that is disposed on one outer surface side of the heat generation roll and inside the power feed shaft with respect to an axial direction of rotation of the-heat generation roll to regulate movement of the lubricating material to a power feed shaft side; and a second oil-repellent material that is disposed on another outer surface side of the heat generation roll and inside the power feed shaft with respect to the axial direction of rotation of the heat generation roll to regulate movement of the lubricating material to the power feed shaft side, wherein the another outer surface side of the heat generation roll is opposite to the one outer surface side of the heat generation roll, wherein a distance between the first oil-repellent material and the second oil-repellent material is greater than a width of the endless fixing belt in the axial direction of the heat generation roll, wherein the first oil-repellent material and the second oil-repellent material are made of a material that repels the lubricating material.

12. An image forming apparatus comprising:

an image holder;

an exposure device that forms a latent image on the image holder;

a developing roll that develops the latent image of the image holder;

a transfer belt that transfers an image of the image holder to a medium; and the fixing device according to claim 11 that fixes the image of the medium.

13. A fixing device comprising:

an endless fixing belt;

a lubrication wick that supplies a lubricating material to an inner surface of the endless fixing belt;

a heat generation roll that supports and rotates the endless fixing belt and generates heat during energization to heat the endless fixing belt;

a power feed shaft that is electrically connected to an end part of the heat generation roll and feeds power to the heat generation roll;

a first recess that is disposed on one outer surface side of the heat generation roll and inside the power feed shaft with respect to an axial direction of rotation of the heat generation roll to regulate movement of the lubricating material to a power feed shaft side; and a second recess that is disposed on another outer surface side of the heat generation roll and inside the power feed shaft with respect to the axial direction of rotation of the heat generation roll to regulate movement of the lubricating material to the power feed shaft side, wherein the another outer surface side of the heat generation roll is opposite to the one outer surface side of the heat generation roll, wherein a distance between the first recess and the second recess is greater than a width of the endless fixing belt in the axial direction of the heat generation roll, wherein the first recess and the second recess are recessed in a radial direction.

14. An image forming apparatus comprising:

an image holder;

an exposure device that forms a latent image on the image holder;

a developing roll that develops the latent image of the image holder;

a transfer belt that transfers an image of the image holder to a medium; and the fixing device according to claim 13 that fixes the image of the medium.

15. A fixing device comprising:

an endless fixing belt;

a lubrication wick that supplies a lubricating material to an inner surface of the endless fixing belt;

a heat generation roll that supports and rotates the endless fixing belt and generates heat during energization to heat the endless fixing belt;

a power feed shaft that is electrically connected to an end part of the heat generation roll and feeds power to the heat generation roll;

a first protrusion that is disposed on one outer surface side of the heat generation roll and inside the power feed shaft with respect to an axial direction of rotation of the heat generation roll to regulate movement of the lubricating material to a power feed shaft side; and a second protrusion that is disposed on another outer surface side of the heat generation roll and inside the power feed shaft with respect to the axial direction of rotation of the heat generation roll to regulate movement of the lubricating material to the power feed shaft side, wherein the another outer surface side of the heat generation roll is opposite to the one outer surface side of the heat generation roll, wherein a distance between the first protrusion and the second protrusion is greater than a width of the endless fixing belt in the axial direction of the heat generation roll, wherein the first protrusion and the second protrusion are formed to protrude in a radial direction.

16. An image forming apparatus comprising:

an image holder;

an exposure device that forms a latent image on the image holder;

a developing roll that develops the latent image of the image holder;

a transfer belt that transfers an image of the image holder to a medium; and the fixing device according to claim 15 that fixes the image of the medium.

* * * * *